US00RE34894E

United States Patent [19]

Golicz

[11] E Patent Number: Re. 34,894

[45] Reissued Date of Patent: Apr. 4, 1995

[54] HIGH SPEED SHEET FEEDER SINGULATOR

[75] Inventor: Roman M. Golicz, Clinton, Conn.

[73] Assignee: Roll Systems, Inc., Burlington, Mass.

[21] Appl. No.: 889,486

[22] Filed: May 27, 1992

Related U.S. Patent Documents

Reissue of:

[64] Patent No.: 4,928,944
Issued: May 29, 1990
Appl. No.: 286,608
Filed: Dec. 19, 1988

[51] Int. Cl.[6] ..... B65H 5/22; B25B 1/02

[52] U.S. Cl. ..... 271/6; 271/16; 271/35; 271/150; 271/152; 271/161; 271/225; 271/258; 271/264; 271/270

[58] Field of Search ..... 271/6, 16, 35, 24, 25, 271/225, 258, 150, 151, 152, 34, 140, 161, 264, 3.1, 31, 270

[56] References Cited

U.S. PATENT DOCUMENTS

| | | | |
|---|---|---|---|
| 1,969,946 | 8/1934 | Root . | |
| 2,161,124 | 6/1939 | Babicz . | |
| 3,683,758 | 8/1972 | Feldkamper | 93/93 |
| 3,894,732 | 7/1975 | Müller | 271/150 X |
| 3,944,213 | 3/1976 | Fallos et al. | 271/10 |
| 4,025,068 | 5/1977 | Collins | 271/34 |
| 4,128,236 | 12/1978 | Lundblad | 271/10 |
| 4,177,982 | 12/1979 | Bewersdorf et al. | 271/151 X |
| 4,376,530 | 3/1983 | Akai | 271/10 |
| 4,397,455 | 8/1983 | Hickey | 271/3.1 |
| 4,500,084 | 2/1985 | McInerny | 271/35 |
| 4,715,593 | 12/1987 | Godlewski | 271/35 X |
| 4,744,555 | 5/1988 | Naramore et al. | 271/161 X |
| 4,871,162 | 10/1989 | Imai et al. | 271/35 |
| 4,981,292 | 1/1991 | Cosgrove . | |

FOREIGN PATENT DOCUMENTS

| | | | |
|---|---|---|---|
| 362404 | 5/1981 | Austria . | |
| 0115208 | 8/1984 | European Pat. Off. . | |
| 1910160 | 3/1968 | Germany . | |
| 1957281 | 5/1971 | Germany | 271/313 |
| 3005569 | 9/1980 | Germany . | |
| 3508981 | 8/1986 | Germany . | |
| 3723589 | 1/1989 | Germany . | |
| 275343 | 11/1989 | Japan | 271/161 |
| 2196324 | 4/1988 | United Kingdom . | |

OTHER PUBLICATIONS

A. B. Habich & G. M. Yanker, IBM Technical Disclosure Bulletin, vol. 17, No. 7, pp. 1848–1849, Dec. 1974.

*Primary Examiner*—Andres Kashnikow
*Assistant Examiner*—Kenneth DeRosa
*Attorney, Agent, or Firm*—Wolf, Greenfield & Sacks

[57] ABSTRACT

High speed sheet feeders receive blocks or bricks of paper sheets, cards or folders stacked edgewise on a downsloping supply ramp, and singulate these for edgewise feeding in rapid succession. The frontmost sheets ready for feeding are buckled and fanned at their upper edges, and their lower edges are arched forward to form a dimple or ridge-shaped pocket by an underlying central traction singulator. A pair of ganged or synchronized feed belts engage the frontmost sheet and propel it rapidly downward edgewise, and a slanting discharge belt receives and diverts the sheet at even higher speed between the discharge belt and a tractive pinch roller. A transfer assembly beneath the discharge belt may receive sheets from an adjacent feeder and interleave them upon command with sheets delivered by the discharge belt.

37 Claims, 9 Drawing Sheets

HIGH SPEED SHEET FEEDER SINGULATOR

Matter enclosed in heavy brackets [ ] appears in the original patent but forms no part of this reissue specification; matter printed in italics indicates the additions made by reissue.

This invention relates to sheet feeder devices for receiving a brick or block of stacked sheets of paper or card stock, or assemblies of folded sheets, intermixed if so desired, capable of singulating individual sheets successively at high speed from the stack, and delivering the singulated sheets edgewise at correctly aligned unskewed orientation in a high speed stream of gap-separated sheets for collating, binding or packaging.

Prior art sheet feeders depend on friction surfaces facing the sheet, and forming a predetermined gap between them, such as two facing rollers, one fixed and one rotating. The rotating roller entrains and feeds the first sheet while the fixed roller prevents the subsequent sheet from being fed. By forcing the fed sheet to "squeeze" past the blocked sheet through the preset gap, the normal tractive "fibre-lock" frictional engagement of the two sheets becomes an obstacle, and the sheet handling singulation speed of such prior devices is severely limited.

The sheet feeders of this invention take advantage of the natural qualities and characteristics of the paper or card sheets, such as stiffness and bendability, to initiate and to promote the singulation and unskewed edgewise delivery of successive sheets at unusually high speeds, in excess of 1,000 sheets per minute in many cases.

The up-ended brick of stacked sheets advances incrementally down a slanting supply ramp, supported and indexed by supply belt means, into engagement with an arching assembly. Lateral upper edges of the proximal sheets sag forward, initiating air separation, while the upper edges of the frontmost sheets are buckled and fanned backwards by overlying paper support rollers as the lower sheet edges shearingly descend into the arching assembly.

The arching assembly incorporates two rapidly moving ganged feed belts facing the front face of the frontmost sheet, flanking a central stationary singulator belt depressing the frontmost sheet frontward between the feed belts in a dimpled or arched "pocket" centered at the lower edge of the frontmost sheet, and serving to break the "fibre-lock" and normal frictional traction engagement between the two or three frontmost sheets in the advancing brick.

The rapidly moving pair of feed belts advance the singulated frontmost sheet rapidly downward, feeding the arched lower leading edge edgewise between a faster moving central pull-out pinch belt and a centered delivery pinch roller, which deflects the pinch belt over a substantial angular arc, 60 degrees for example, thus bending and redirecting the sheet into a high speed delivery path. The centrally positioned pinch arc pulls the advancing sheet from its arched engagement between the ganged feed belts and the singulator belt, assuring correct alignment of the sheet and resisting any tendency toward skewed misalignment.

This assembly of supply roller, supply belts, high speed feed belts and higher speed pinch belt and pinch roller thus assures singulation of individual sheets while separating them from the supply brick and bending them into an underlying high speed delivery path, where they are carried by rapidly moving delivery belts to a delivery station.

An underlying transfer assembly actuated by a transfer clutch and driven by the pull out pinch belt delivers additional sheets or cover pages from a previous sheet feeder upon command into interleaved relationship between successive predetermined sheets delivered by the delivery belts.

Sensors monitor the resupply of fresh sheets arriving at the feed belts and the singulation of sheets fed to the pull-out pinch belt and pinch roller. Imprinted bar codes or similar machine-readable indicia may be employed to actuate the transfer clutch and trigger the transfer assembly for interleaving operation.

Thus, a principal object of the present invention is to provide sheet feeders adapted to convert a brick of stacked paper or card sheets, or folded sheet assemblies, into a high speed stream of gap separated sheets or folders reliably singulated and traveling edgewise toward a delivery station.

A further object of the invention is to provide such sheet feeders capable of taking advantage of the natural resilient stiffness and arching bendability of sheets, cards or folders and by fanning, buckling or arching, creating a dimpled pocket at the sheet's lower leading edge tending to break the natural face-to-face "fibre-lock" tractive adhesion of adjacent sheets while propelling the frontmost sheet edgewise toward the delivery station.

Still another object of the invention is to provide such sheet feeders incorporating underlying transfer mechanisms for inserting or interleaving sheets fed by previous sheet feeders in a multiple serial array.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be made to the following detailed description taken in connection with the accompanying drawings, in which:

BRIEF DESCRIPTION OF THE DRAWINGS

FIG. I is a perspective view of a sheet feeder of the present invention.

THE BEST MODE FOR CARRYING OUT THE INVENTION

Figure 1:
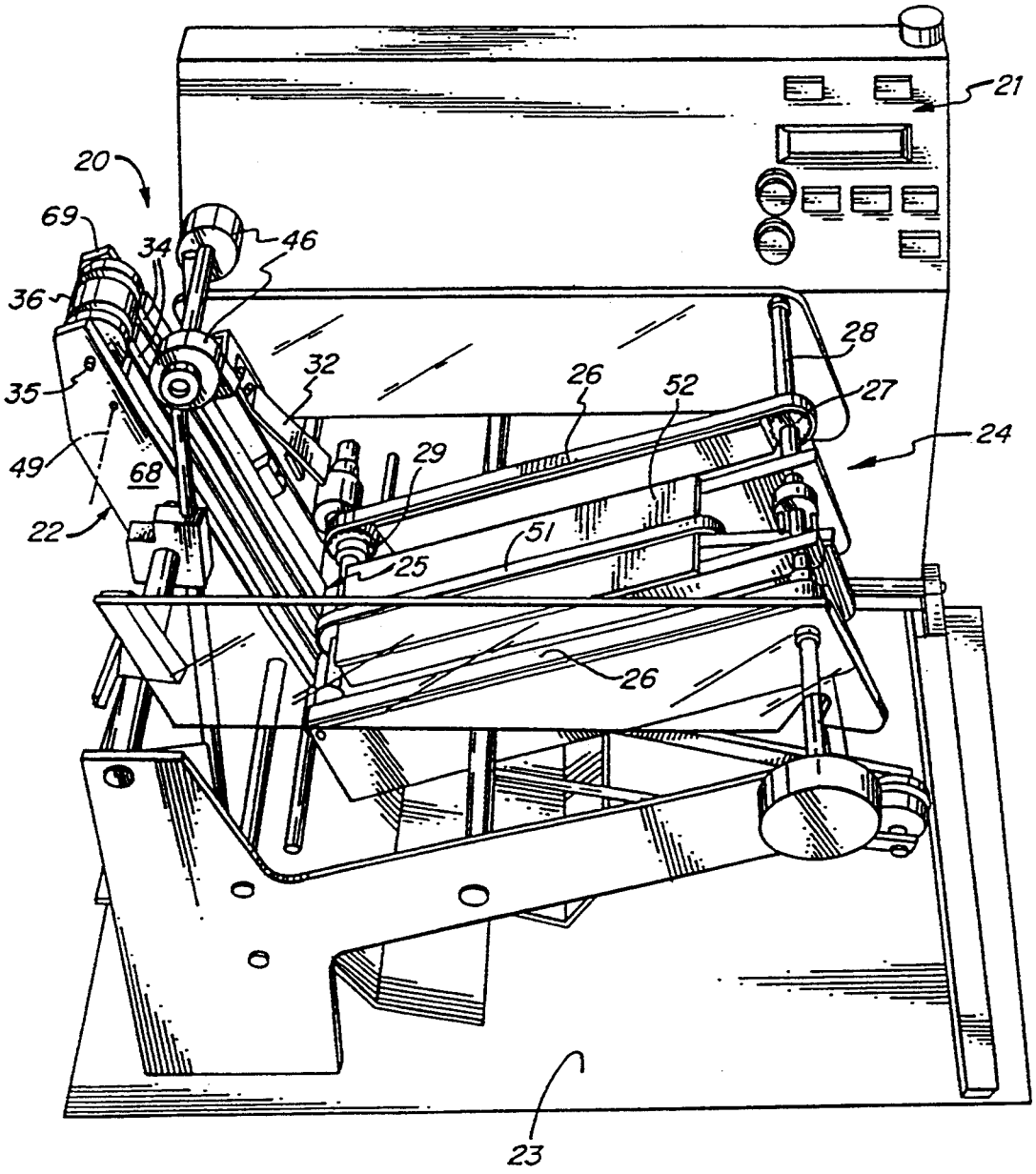

The sheet feeder 20 shown in the drawings incorporates a rear control panel 21, and an upright slanting feed pedestal 22 both upstanding from the left or "feed" end of a base 23, as viewed in FIG. 1, which also supports a supply ramp assembly 24 slanting downward above the right or "delivery" end of base 23 and converging at substantially a right angle toward the feed pedestal 22, but spaced therefrom by a feed slot region 25, through which successive sheets are fed downward at high speed by the device.

A pair of endless timing belts are employed as supply belts 26 extending down the front and rear portions of downwardly slanting supply ramp assembly 24, each encircling a drive pinion 27 keyed to a supply shaft 28 at the right upper loading end of ramp 24 and an idler pinion 29 rotatably mounted at the left lower feed end of ramp assembly 24.

As shown by dash lines in FIG. 1, a block or brick 31 of stacked paper sheets, cards or folders is upended and loaded on supply ramp assembly 24, with the lower edges of the stacked sheets supported spanning supply belts 26. The frontmost sheets of brick 31 lean against the feed pedestal 22, engaging and depressing a resilient supply sensing leaf spring 32 into engagement with a supply sensor switch 33, confirming the presence of the brick of sheets loaded on ramp assembly 24.

Figure 9:
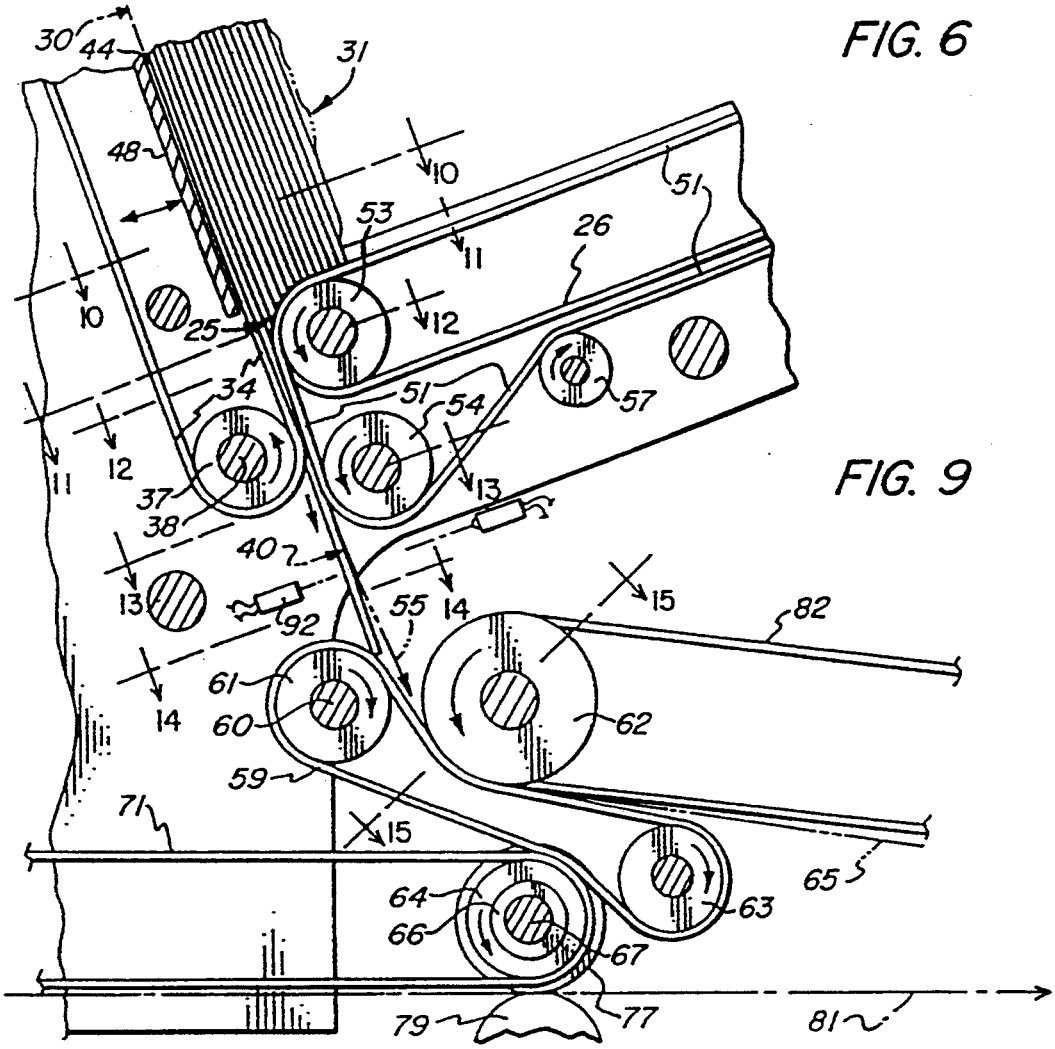
FIG. 9 is a fragmentary enlarged cross-sectional elevation view of the feed zone of the device illustrating a side view of the feed path taken by successive sheets as they travel through the sheet feeder.
Figure 7:
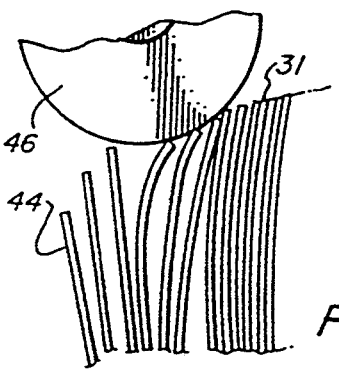
FIG. 7 is an enlarged fragmentary detailed crosssectional front elevation view of the upper portion of the sheet feeder showing the fanning and buckling of proximal sheets as they reach the feed belts.

As shown in FIGS. 7 and 9, the frontmost sheets of stack 31 lean against a pair of endless timing feed belts 34 each extending down the face of feed pedestal 22 between a rotatable upper idler pinion 36 and a drive pinion 37. Both idler pinions 36 are mounted on a common idler shaft 35 and both drive pinions 37 are mounted and keyed on a common feed drive shaft 38, assuring the precise "ganged" synchronism of both feed belts 34.

Figure 3:
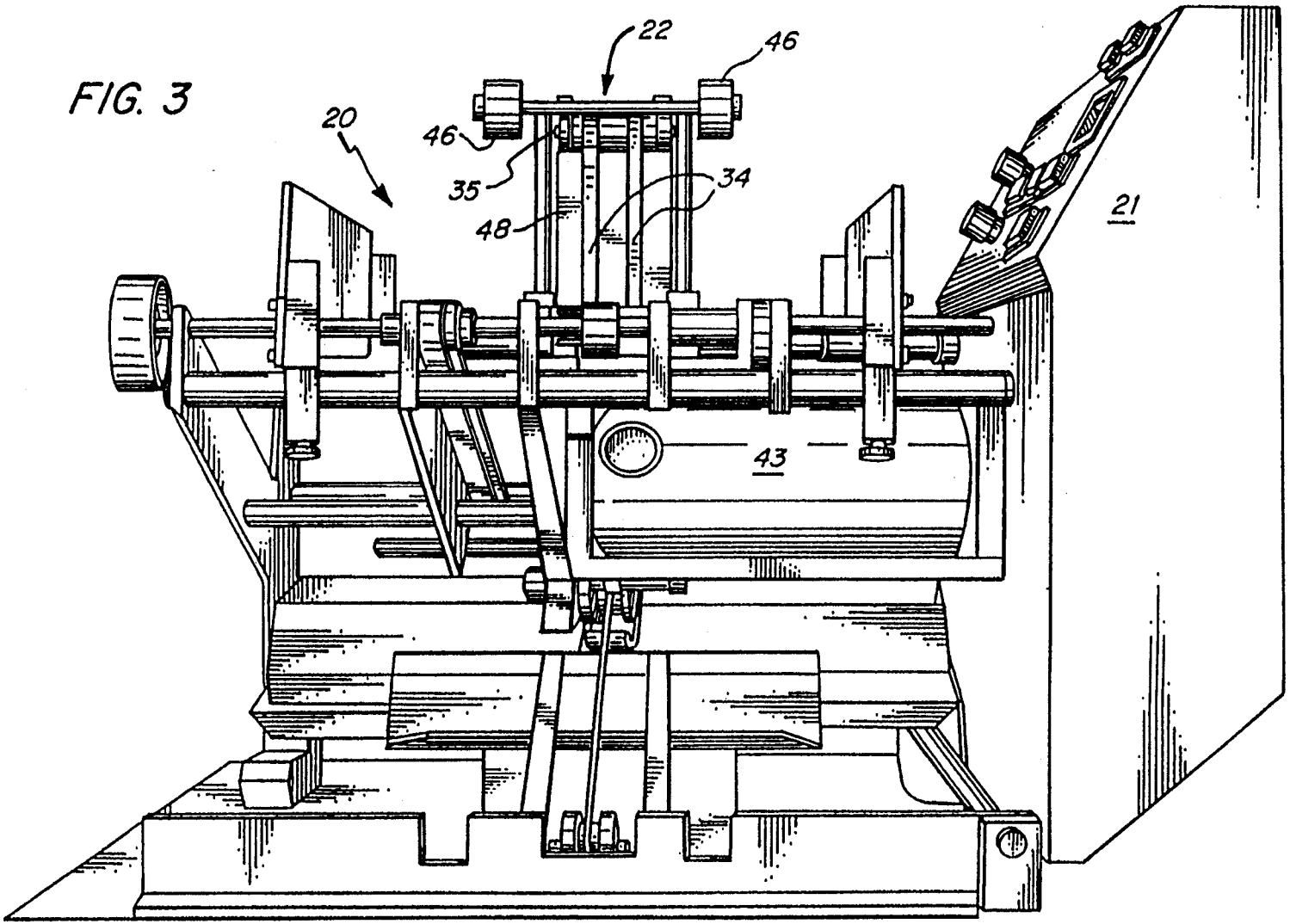
FIG. 3 is a right-end perspective view of the same sheet feeder of the present invention.
Figure 4:
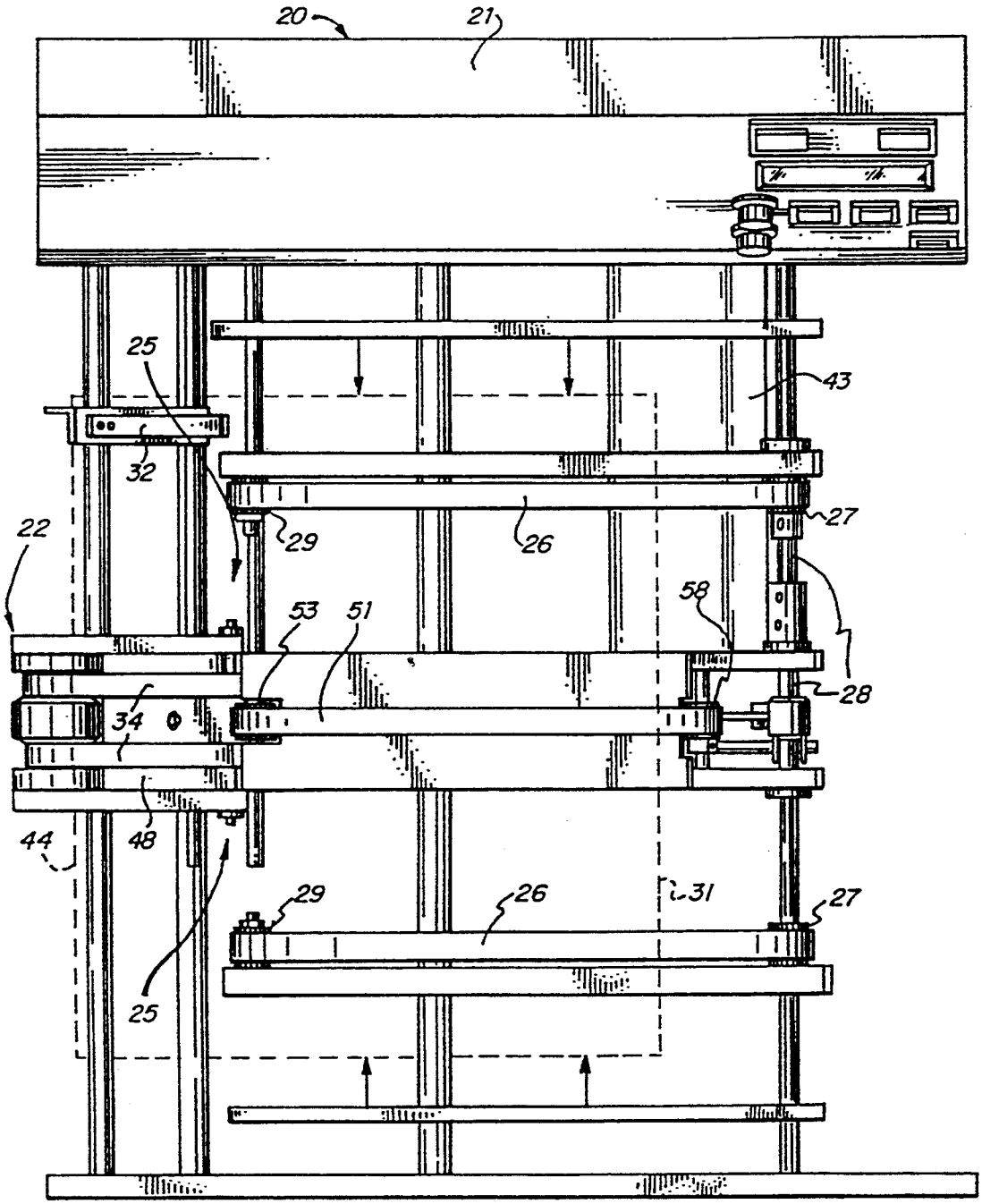
FIG. 4 is a top plan view of the same sheet feeder.
Figure 5:
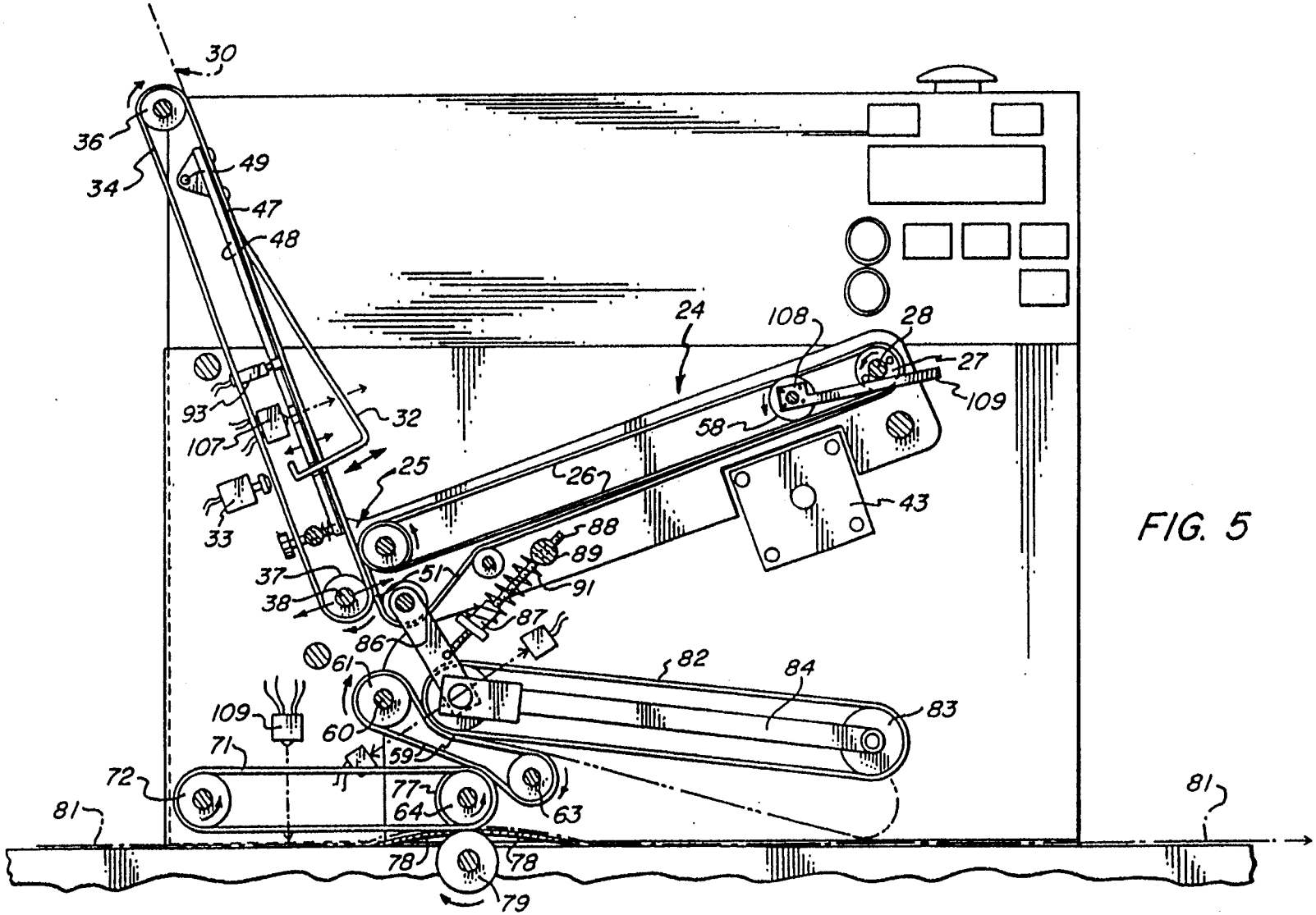
FIG. 5 is a cross-sectional front elevation view of the same sheet feeder showing the relationships of the moving parts of the device.
Figure 6:
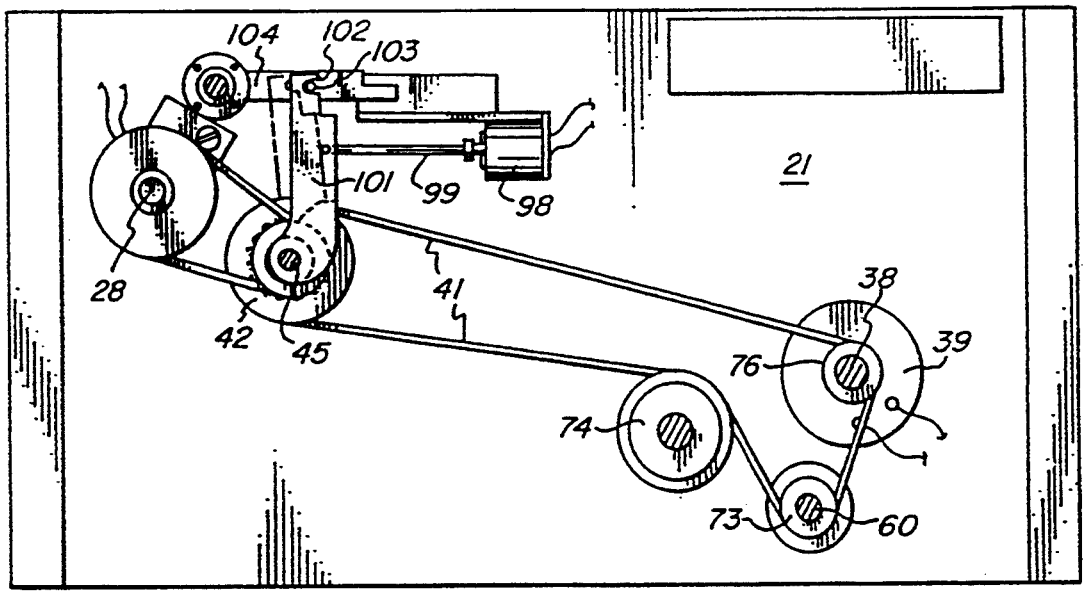
FIG. 6 is a fragmentary rear elevation view of the sheet feeder showing its drive belts and clutch mechanisms.

As shown in FIG. 6, the rear end of feed drive shaft 38 is connected by a feed clutch 39 to a timing drive belt 41 driven by a main drive pinion 42 on the shaft of a drive motor 43, positioned beneath supply ramp assembly 24, as shown in FIGS. 3, 4, and 5.

Figure 8:
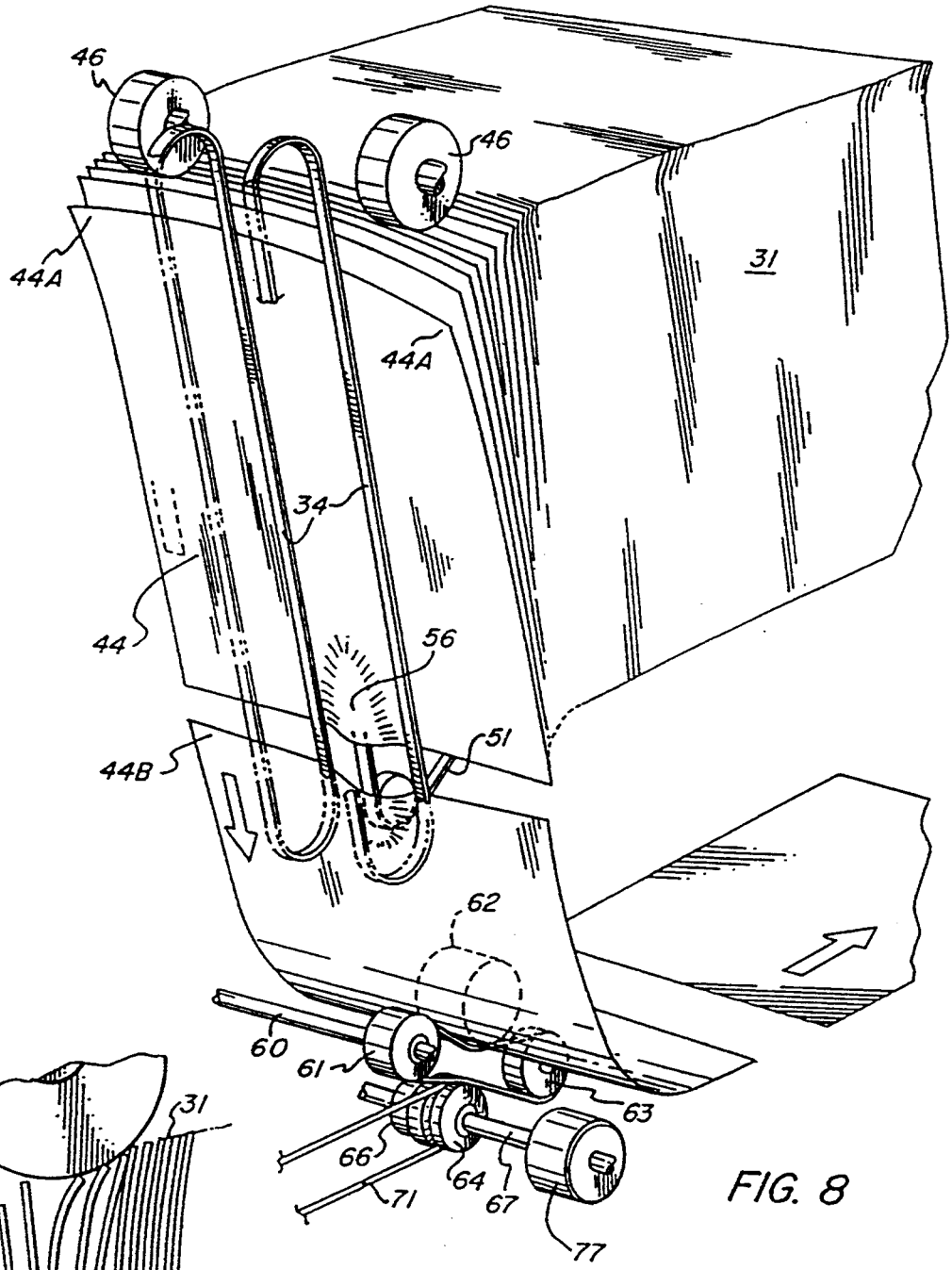
FIG. 8 is a fragmentary perspective schematic view showing the loaded stacked sheets ready for feeding entering the feed zone and traveling through the sheet feeder of the present invention, illustrating the feed path followed by each successive sheet in turn.
Figure 10:
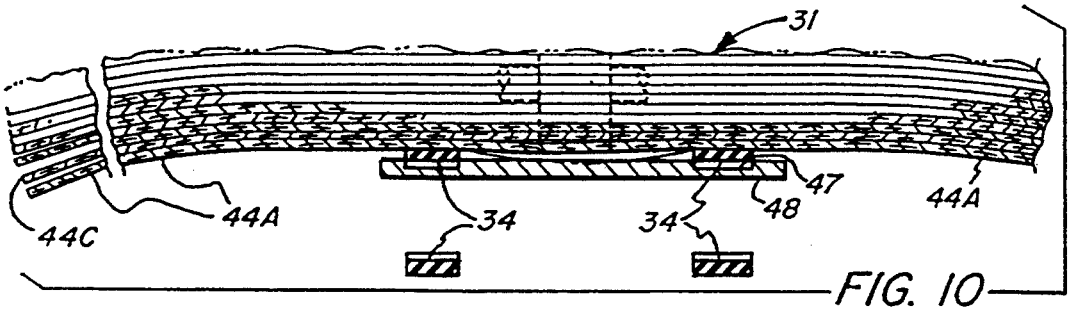
Figure 15:
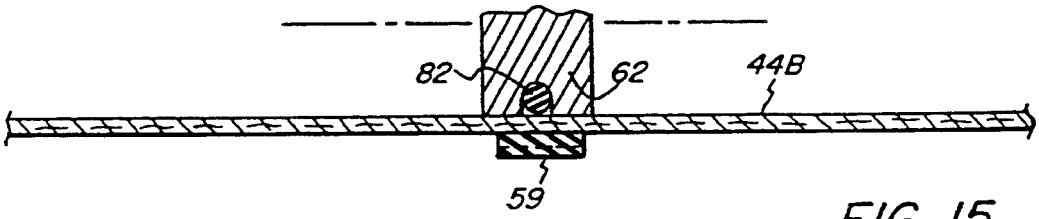

Singulation of the frontmost sheet 44 or folder in brick 31 is initiated as the up-ended brick is loaded on supply ramp assembly 24. Sheet 44 and the sheets immediately behind it are retained centrally where they lean against feed belts 34 extending down the exposed face of back plate 35 on feed pedestal 22, but the outer upper corners 44A of these sheets are unrestrained, and tend to lean further forward, as shown in FIG. 8 and at the upper portion of FIG. 10, fanning out and separating at these upper corners. At the same time, sheet 44 and the sheets directly behind it have their lower edges riding on supply belts 26 where these belts are wrapped downward around idler pinions 29 directly adjacent feed belts 34 in feed slot region 25 (FIG. 9). The central portions of the upper edges of these same sheets engage overlying supply rollers 46 adjusted to deflect and buckle these upper sheet edges by bending them concavely toward brick 31, and away from feed belts 34, further separating these upper sheet edges and admitting air between them.

SHEET FEEDING OPERATION

The driving segments of belts 34 facing the frontmost sheet 44 of brick 31 travel in sliding engagement down parallel guide grooves 47 formed in a back plate 48 which is positioned for adjustable movement toward and away from brick 31, preferably pivoting about an upper pivot axis 49 parallel to the upper idler shaft 35.

As can be seen in FIG. 5, the pivoting angular adjustment of backplate 48 about axis 49 swings its lower edge toward the loaded brick of sheets supported on supply belts 26, moving the lower portion of the entire brick of loaded sheets toward the right as viewed in FIGS. 5, 8 and 9. Supply belts 34 riding in guide grooves 47 on backplate 48 are thus urged into tractive friction engagement with the frontmost sheet 44 of the brick 31.

As the backplate 48 continues its adjusted movement toward brick 31, feed belts 34 actually pass the zero position of a central singulator belt 51, as indicated in FIGS. 1 and 4. Singulator belt 51 rides beneath brick 31 along a groove in a central plate 52 generally parallel to supply belts 26 on supply ramp assembly 24. Singulator belt 51 may be synchronized with supply belts 26 for slow indexed incremental movement advancing brick 31 toward the feed pedestal 22. However, singulator belt 51 is preferably independently mounted, with its upper run, as is clearly shown in FIG. 1, being positioned slightly below the plane defined by the two supply belts 26, and if desired, below the level of plate 52 so that singulator belt 51 does not normally touch the lower edges of the sheets forming brick 31.

However, following its long upper run illustrated in FIG. 1, the singulator belt 51 follows a path different from the paths of the supply belts 26, as indicated in FIGS. 5 and 8. Singulator belt 51 preferably travels around an idler pinion 53 which may be mounted on the same shaft as idler pinions 29 of supply belts 26, but it travels only about a quarter turn around this idler pinion directly under the forward end of brick 31 in feed slot 25, and then descends for a short downward run to a second idler roller 54. This roller 54 is journalled below the idler 53 and slightly closer to the advancing path of feed belts 34 than is idler 53, causing the short downward run of singulator belt 51 as it passes around idler 53 and the lower idler 54 to converge with the path of feed belts 34, as illustrated in FIG. 9.

Thus, when a pivoting adjustment movement of backplate 48 moves feed belts 34 toward frontmost sheet 44 of brick 31, feed belts 34 may pass the plane of this frontmost run of singulator belt 51, causing an arched curvature in the lower edge of frontmost sheet 44 and thereby producing an arched dimple ridge or pocket 56 in sheet 44. Thus in FIG. 8 the central lower portion of sheet 44 is shown arched forward between feed belts 34 by the singulator belt 51 in tractive engagement with its rear face.

Singulator belt 51 is essentially stationary as compared to high speed feed belts 34. In fact, singulator belt 51 completes its circuit around its supporting rollers and pinions by encircling lower idler roller 54 over an arc of about 120 degrees and then ascends rearwardly over a third idler 57 for a return run beneath the supply ramp away from feed belts 34 to encircle a singulator drive pinion 58, positioned near drive shaft 28.

While singulator belt 51 could be installed as a stationary elastomer block, rather than a belt, it has been found useful to advance singulator belt 51 in small increments during the operation of the machine, merely to assure that the abrasion and polishing of its active traction surface applied against the sheet 44 being fed through the device is equalized, to spread wear on the tractive surface of singulator belt 51 equally over its entire outer surface rather than continually polishing a single small face portion of belt 51.

It should also be noted that the "height" of the arched ridge 56 formed in the face of frontmost sheet 44, beyond the balance of its front surface between feed belts 34, is governed by the extent of intrusion or interference of singulator belt 51 between and beyond the feed plane 30 of feed belts 34 against which frontmost sheet 44 is positioned by the weight of the front most sheets of resupply brick 31. The extent of this intrusion is governed either by forward adjustment of second idler roller 54, advancing the lower end of the short downward run of singulator belt 51, or by the corresponding pivoting adjustment of backplate 48 about its pivot axis 49, moving the flanking feed belts 34 toward and past singulator belt 51, to produce the desired extent of intrusion, which is selected to provide the most effective feed singulation of each sheet 44 in turn.

The normal stiffness and bendability of each sheet 44 contributes to its fanning and buckling along its upper edge induced by supply rollers 46, and also to downward displacement of the foremost sheets as the supply belts 26 descend around their idler pinions 29, and the same flexible bendability of these frontmost sheets 44 governs their resistance to the intrusion of singulator belt 51 and determines the height by which the ridge of pocket 56 is displaced from the feed plane 30 of feed belts 34, forming an arched dimple in the lower edges of frontmost sheets 44. As a result, the fanned, buckled and lower-edge-arched sheets are shingled vertically downward and shingled laterally inward as they approach and reach feed belts 34.

The high speed feeding action of the sheet feeding devices of the present invention is produced by tractive engagement of both ganged feed belts 34 with the front surface of frontmost sheet 44, as illustrated in FIG. 8, and defining a feed plane 30 (FIGS. 5 and 9). The high coefficient of friction and the large tractive area of the feed belts 34 passing from the upper edge of frontmost sheet 44 to its lower edge, down its entire length, produce a high downward shearing "feed" force.

This feed force overcomes the small resisting force contributed by the surface of singulator belt 51 on the opposite, rearward face of frontmost sheet 44 as well as the normal frictional resistance between the rear face of sheet 44 and the frontmost face of the next underlying sheet. This inter-sheet "fibre-lock" friction force has also been reduced by the fanning and buckling of the upper corners and edges of these sheets under the action of supply belts 26 and supply rollers 46, as shown in FIGS. 7 and 8.

The fanning and buckling of these upper edges, promoting the admission of air between these frontmost sheets, significantly reduces their surface adherence and minimizes frictional resistance to their shearing separation under the influence of feed belts 34. The high speed feed belts 34 moving downward in their feed run thereby draw sheet 44 from the surface of brick 31 and drive it briskly downward in high speed edgewise movement toward the position of sheet 44B illustrated in FIG. 8, along a feed path 40 (FIG. 9) substantially lying in feed plane 30.

As the lower edge of rapidly advancing sheet 44 is fed downward past the lower end of drive belts 34 encircling their drive pinions 37, this lower edge of the descending sheet 44 slides into converging engagement with a pull-out or discharge belt 59 centrally positioned below the singulator belt 51 directly between the separate planes defined by the two high speed feed belts 34. Feed belts 34 travel at high speed, but the pull out or discharge belt 59 is driven at a still higher speed by its discharge drive pinion 61, indicated in FIG. 9.

The path followed by discharge belt 59 as it travels around its drive pinion 61 and converges with the advancing sheet 44 continues for a short slanting downward run passing the plane of advancing sheet 44 and carrying its lower edge under singulator belt 51 beneath supply ramp assembly 24 along a slanting discharge path 55 (FIG. 9) into converging engagement with a nip or pinch roller 62 in driven engagement with discharge belt 59. Intruding roller 62 substantially deflects the descending run of belt 59 into tangent engagement with roller 62 over a significant arcuate sector of 60 degrees, for example, following which discharge belt 59 departs tangentially from roller 62 in a less steep downward path to encircle an idler roller 63, projecting each discharged sheet edgewise along a delivery path 65 shown in FIG. 9.

DRIVE MECHANISM

Figure 2:
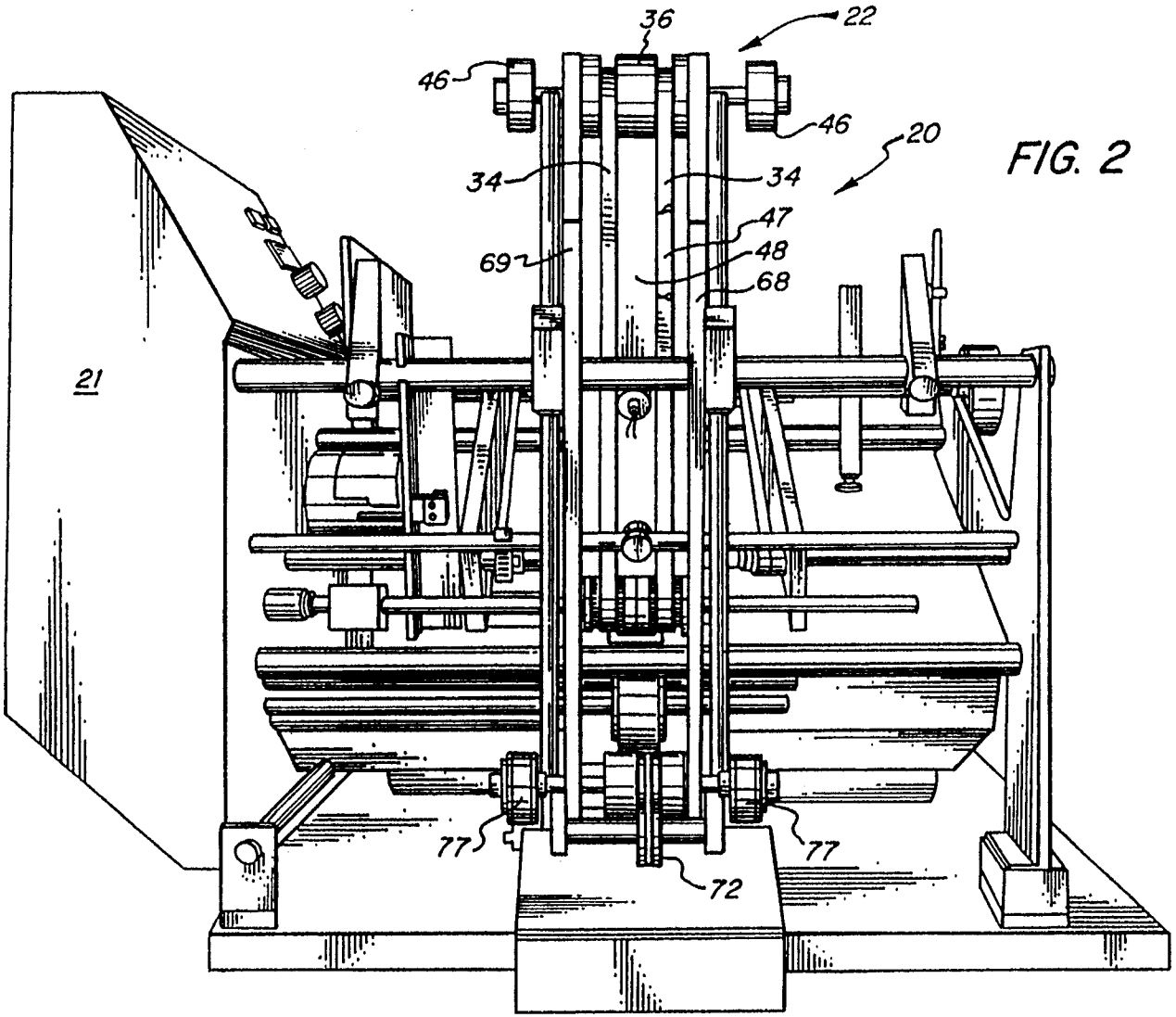
FIG. 2 is a left end perspective view of the same sheet feeder showing the feed pedestal.

From roller 63, discharge belt 59 returns directly to its discharge drive pinion 61 but this return run of discharge belt 59 is depressed inwardly by an elastomeric transfer drive roller 64 mounted via an engageable and releasable transfer clutch 66 (FIGS. 2 and 9) for free rotation on its supporting shaft 67, which is journalled for independent rotation in the front and rear pedestal walls 68 and 69 (FIG. 2) which provide the structural frame for feed pedestal 22. Transfer drive roller 64 is grooved to accommodate a transfer belt 71 for tractive engagement and connecting it to a transfer idler roller 72.

Discharge drive pinion 61 is continuously rotating, driving the pull out or discharge belt 59 at the highest linear speed employed in the device. Drive pinion 61 is keyed to its own discharge drive shaft 60 journalled in and extending through the front wall of rear control panel 21. Behind panel 21, as shown in FIG. 6, shaft 60 carries a discharge drive sheave 73 connected by timing drive belt 41 via a tensioning idler pulley 74 to main drive pinion 42 mounted on the shaft 45 of the drive motor 43. Drive belt 41 returns to discharge drive shaft 60 and drive sheave 73 by way of feed timer pinion 76 mounted for free rotation on the feed drive shaft 38 and keyed thereto by feed clutch 39, all as shown in FIG. 6.

Continuously driven discharge drive pinion 61 thus drives this pull out or discharge belt 59 continuously, ready to receive each new sheet delivered to it by the feed belts 34. In addition, the continuously traveling discharge belt 59 rotates transfer drive roller 64 continuously, producing continuous movement of transfer belt 71 and idler roller 72. Mounted on shaft 67 on opposite sides of transfer drive roller 64 and belt 71 are a pair of elastomer rimmed transfer rollers 77 (FIGS. 2, 5, 8 and 9). Being keyed on shaft 67, transfer rollers 77 are normally stationary, except when transfer clutch 66 is actuated to engage, causing shaft 67 and transfer rollers 77 to rotate with the constantly rotating transfer drive roller 64.

When stationary, the pair of transfer rollers 77, each mating with a resilient idler pinch roller 79 through an aperture in a resilient sheet metal ramp 78 (FIG. 5).

Rollers 77–79 together act as a stop against which new sheets of material delivered beneath feed pedestal 22 from the left side of the device as shown in FIG. 1 slide up ramp 78 and come to a stop. The leading edge of each such sheet stops between pairs of rollers 77 and 79 with the upper sheet face engaging constantly moving transfer belt 71. Upon command by the electronic control circuitry, which is armed by a transfer sensor 109 in response to the arrival of a sheet on ramp 78, transfer clutch 66 is engaged, and transfer rollers 77 rotate in engagement with the idler pinch rollers 79 positioned beneath ramp 78. When rollers 77 and 79 are rotating in rolling pinch-roller engagement, the sheet previously delivered up ramp 78 and blocked by rollers 77 and 79 in their stationary position is now seized and delivered through the transfer region of the device underlying discharge belt 59 along the transfer path 81 shown in dot-dash lines in FIGS. 5 and 9, beneath the normal delivery path 65 of sheets fed rapidly through the device from brick 31 between discharge belt 59 and nip roller 62.

Finally, a delivery belt 82 encircles a deep groove in nip roller 62 and extends therefrom above delivery path 65 and transfer path 81, beneath supply ramp assembly 24 and motor 43, to encircle a remote delivery idler roller 83 rotatably mounted at the end of a delivery arm 84, which is itself angularly pivoted at its proximal end to the shaft of nip roller 62 (FIG. 5). This nip roller shaft is journalled at the lower end of a pivot arm 86 whose upper end is pivotally mounted on the shaft supporting second idler roller 54 of the central singulator belt 51.

Nip roller 62 is positioned in engagement with and deflecting the pull out or discharge belt 59 by an adjustable spring collar 87 in threaded engagement with a threaded post 88 pivotally joined to the middle of pivot arm 86 and having its opposite end in sliding engagement with the bore of a stop 89 anchored to supply ramp assembly 24, with a compressed helical coil spring 91 encircling threaded post 88 and maintained in resilient compression between stop 89 and collar 87. By adjusting the threaded position of collar 87 on post 88, the compressive force applied by the compressed coil spring 91 against the collar 87 may be adjusted, correspondingly changing the compressive force applied through pivot arm 86 to pinch roller 62 to deflect the pull out or discharge belt 59.

FIGS. 10 through 15 show successive horizontal cross-sectional views of sheets traveling through the device.

Figure 13:
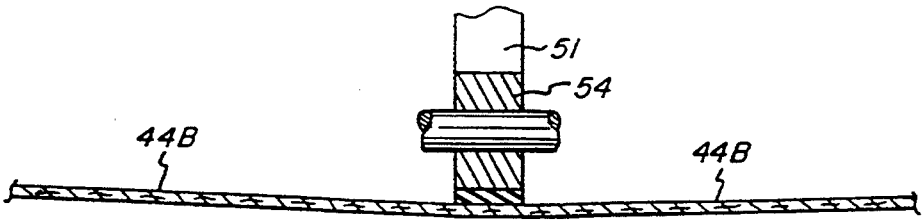
FIGS. 10 through 15 are successive transverse cross-sectional plan views taken at successive cross sectional planes 10—10 through 15—15 inclusive as shown in FIG. 9 illustrating the relationship of the moving parts of the device and the sheets as they are being fed and traveling along the feed path of the sheet feeder.
Figure 12:
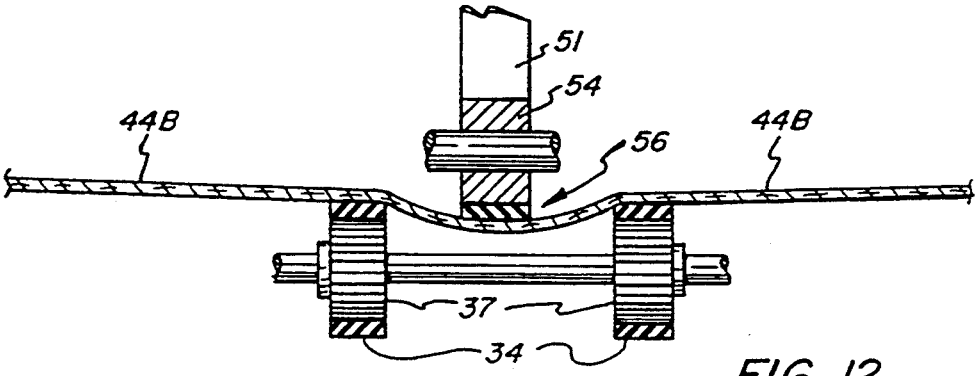
Figure 11:
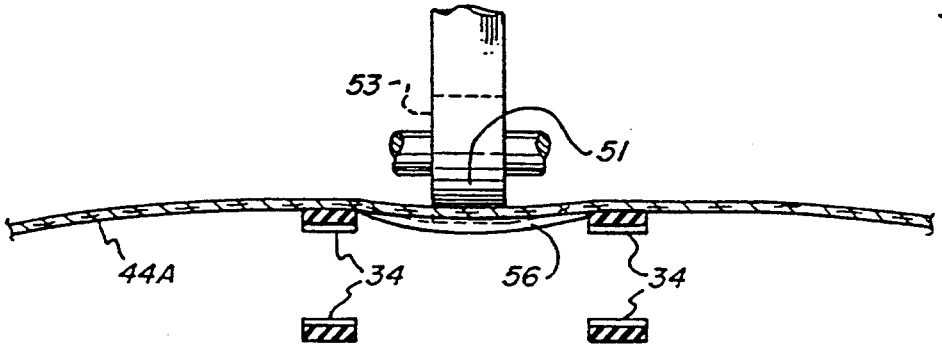
Figure 14:
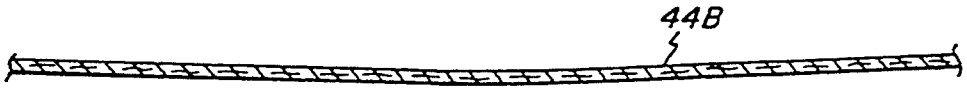

The paper fanning and buckling operation of supply rollers 46 (FIG. 7) cooperating with supply belts 26 thus initiates the singulation of sheets and the ganged high speed feed belts 34 (FIG. 10) co-acting with stationary singulator belt 51 create arched dimple or pocket 56 (FIG. 11) completing the singulation as the forwardmost sheet 44 is fed rapidly downward along feed path 40 by the feed belts (FIG. 12–14).

The central pull-out or discharge belt 59 cooperating with nip roller 62 (FIG. 15) seizes the sheet 44 and draws it downward toward position 44B along discharge path 55 at even higher speed, while the drag provided by singulator belt 51 on the next subsequent sheet virtually assures a second singulation if two sheets should be fed together by feed belts 34. The central position of discharge belt 59 and nip roller 62 between feed belts 34 provides non-skewed discharge of the frontmost sheet at high speed toward delivery path 65, converging toward transfer path 81, all as shown in FIG. 9.

The convergence of delivery path 65 and transfer path 81 permits the serial use of two or more sheet feeder devices 20 of this invention, aligned to deliver sheets fed along paths 40–55–65 or path 81 by the first feeder 20 directly to the transfer assembly of the next succeeding sheet feeder 20, where each arriving sheet is stopped with its leading edge between rollers 77 and 79 until transfer clutch 66 is actuated. Clutch 66, engaging rollers 77 to shaft 67, actuates pinch-rollers 77–79 to drive each stopped sheet forward along path 81.

Clutch 66 is preferably controlled by automatic circuitry, responding to a sheet counter, or to indicia imprinted on each sheet. For example, a cover page delivered to and held in the transfer assembly may be propelled forward along path 81 by pinch-rollers 77–79 to cover a pre-counted stack of sheets already delivered by the feeder along paths 40–55–65.

In the unlikely event that two adhering sheets are drawn together through the feeder along paths 40 and 55, a photo electric sensor 92 and lamp 94 flanking path 55 (FIG. 9) and adjusted to respond to the increased opacity of two or more sheets will deliver a signal operatively connected to disengage feed clutch 39, halting feed movement of feed belts 34. The extra sheet may then be removed.

Even faster disengagement of sheet 44 from feed belts 34 is preferably achieved through the installation of a retractable brake plunger 93, positioned between belts 34 and reciprocable between a first withdrawn position forward of and out of contact with sheet 44 and a second extended position urging sheet 44 backward out of engagement with feed belts 34. Plunger 93 is extended in response to a multiple-sheet signal from sensor 92, providing instant disengagement of sheet 44 even before the inertia of belts 34 and their drive mechanism permits belts 34 to come to a stop.

In order to overcome the fibre-lock adherence tendency between forwardmost sheet 44 and its next following sheet, the tractive retaining force applied to the following sheet by singulator belt 51 may be increased by increasing the extent of intrusion of belt 51 between feed belts 34, by moving the lower idler roller 54 forward, or by pivoting back plate 48 toward the stacked brick of sheets 31.

In addition, the tractive pull-out force applied by discharge belt 59 and nip or pinch roller 62 can be increased by adjusting spring collar 87 on threaded shaft 88 toward stop 89, thereby pivotally adjusting pivot arm 86 to urge nip roller 62 toward discharge belt 59.

Either or both of these adjustments can be employed to assure effective singulation of each sheet 44 in turn as it is driven downward along paths 40 and 55.

A further photosensor 96 and lamp 97 aligned flanking delivery path 65 near nip or discharge roller 62 (FIG. 5) will sense any extra paper sheet that may have adhered to sheet 44 as it enters the pinch assembly of discharge belt 59 and nip roller 62. The output signal from sensor 96 can actuate a suitable brake stopping nip roller 62 and holding the extra sheet by traction, while discharge belt 59 delivers sheet 44 along discharge path 65. The control circuitry may be set to release the brake and free roller 62 to deliver the extra sheet, or to shut down the feeder's operation to avoid any undesired mismatching of delivered stacks of sheets.

CONTINUOUS PAPER RE-SUPPLY

An ample supply of fanned forwardmost sheets 44 at the forward end of brick 31 is maintained ready to be fed downward b feed belts 34, because the light weight of these fanned forwardmost sheets leaning against and deflecting resilient leaf spring 32 depresses plunger supply sensor switch 33.

Whenever more sheets are required to deflect spring 32, and the plunger of sensor 33 is thus extended, sensor 33 energizes a supply solenoid 98, retracting an arm 99 to pivot a notched supply lever 101 toward solenoid 98, as shown in FIG. 6. Supply lever 101 has its lower end mounted on an eccentric bushing 100 on drive shaft 45 of motor 43. A notch 102 on lever 101 is aligned with a follower pin or roller 103 on a crank arm 104, which is connected by a one-way clutch 106 to supply shaft 28.

In the energized condition of solenoid 98 shown in solid lines in FIG. 6, lever 101 is pivoted clockwise about its eccentric bushing 100, bringing notch 102 into engagement with follower pin 103. This causes oscillating movement of lever 101 induced by bushing 100 to produce reciprocating pivoting motion of crank arm 104, actuating clutch 108. Incremental angular rotary motion of shaft 28 results with every oscillation of bushing 100. Supply belts 26 thus advance brick 31 incrementally toward feed belts 34, until arriving forwardmost sheets 44 deflect spring 32, depressing plunger sensor 33, and de-energizing solenoid 98. This extends arm 99, moving notch 102 counterclockwise out of engagement with follower pin 103, ending movement of crank arm 104 and incremental advance of brick 31.

A brick sensor 107 positioned near spring 32 on pedestal 22 (FIG. 5) responds to the exhaustion of brick 31 by triggering the control circuitry connected to control panel 21, and shutting down the sheet feeder 20 until a new supply brick 31 is stocked on supply ramp assembly 24.

A second one-way clutch 108 is connected to actuate singulator drive pinion 58 in response to reciprocating angular motion of singulator crank arm 109 extending from clutch 108, into engagement with an actuating cam on supply shaft 28. Incremental angular motion of shaft 28 thus advances brick 31 incrementally, and also reciprocates crank arm 109 in increments. As a result, singulator belt 51 slowly progresses around its drive pinion 58 and its two idler rollers 53 and 54, equalizing traction wear on the face of belt 51 engaging the rear face of each sheet fed downward by feed belts 34.

It will thus be seen that the objects set forth above, and those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A high speed sheet feeder comprising:

a supporting base having a feed end and a delivery end, an upstanding feed pedestal mounted at the feed end of the base and slanting steeply downward toward a central portion of the base, a supply ramp mounted on and spaced above the base, slanting downward toward the feed pedestal and defining therewith a feed slot region therebetween,

[sheet supply] means *for supplying sheets* mounted on the supply ramp and positioned to support a large plurality of individual sheets stacked as a brick thereon with their edges facing the supply ramp and with the face of the forwardmost sheet leaning against the pedestal above the feed slot region, a pair of endless flexible feed belts mounted on power-driven [roller means] *rollers* on the pedestal with substantially straight and parallel portions of their respective outer traction surfaces spaced apart along descending paths facing said forwardmost sheet, defining a feed plane, and traveling in synchronism downward toward the feed slot region, a downwardly curving central singulator positioned at the feed end of the supply ramp extending across the feed slot region and the feed plane between the pair of feed belts, and presenting a traction face to the side of the forwardmost sheet opposite to said feed belts' traction surfaces, an endless flexible discharge belt mounted on power-driven roller means, below the feed slot region, having a downwardsloping upward-facing traction run crossing the feed plane below the supply ramp, midway between the descending feed belt paths, a discharge pinch roller rotatably mounted beneath the supply ramp tractively engaged with and depressing the traction run of the discharge belt to produce tractive engagement thereof with the pinch roller over an arcuate sector of the pinch roller leading to a delivery path extending between the base and the supply ramp toward the delivery end of the base, and means driving the discharge belt's traction run at a substantially faster linear velocity than the velocity of the synchronized feed belts traveling downward in the feed plane, whereby each forwardmost sheet of the brick of stacked sheets in turn is tractively engaged by the feed belts with its lower edge arched between the feed belts by the singulator, thereby breaking the fibre-lock friction bond between the forwardmost sheet and its next adjacent sheet, and whereby the forwardmost sheet is propelled downward edgewise by the synchronized feed belts along a feed path substantially coinciding with the feed plane, with the centered discharge belt receiving and guiding its lower edge between the discharge belt and the discharge pinch roller, through the arcuate sector of their tractive engagement, thereby propelling the sheet along the delivery path.

2. The sheet feeder defined in claim 1 wherein the feed pedestal defining the descending paths of the feed belts is positioned in the central portion of the forwardmost sheet of the supply brick, whereby the upper corners of said sheet and the next succeeding sheets are unsupported by the feed belts or the feed pedestal and are free to lean fanningly forward admitting air therebetween.

3. The sheet feeder defined in claim 1, wherein the singulator is adjustable to change the distance by which the singulator extends beyond the feed plane and intrudes between the feed belts.

4. The sheet feeder defined in claim 1 wherein the singulator is formed by the feed slot portion of an endless elastomer singulator belt supported by a plurality of rollers on the supply ramp with its outer traction face presented in the feed slot protruding through the feed plane, and including indexing drive means advancing the singulator belt in periodic increments upon command.

5. The sheet feeder defined in claim 1 wherein the discharge belt comprises a ribbed endless elastomer timing belt.

6. The sheet feeder defined in claim 1 wherein the discharge pinch roller is adjustably mounted to advance and retract the pinch roller between an extended position of maximum deflection of the traction run of the discharge belt and maximum angular arcuate engagement sector, and a retracted position of minimum deflection and minimum angular engagement sector.

7. The sheet feeder defined by claim 1 including a plurality of sheet sensor means each responsive to the presence of a sheet at a predetermined point in the device, the output signals from all said sensor means being connected to control circuitry governing the drive components producing movement of the traction runs of the feed belts and the discharge belt.

8. The sheet feeder defined by claim 1, further including a brake plunger positioned to urge the forwardmost sheets arriving at the feed plane away from the feed belts to provide instant interruption of feeder operation.

9. The sheet feeder defined in claim 1, further including a back plate pivotally mounted on the feed pedestal and presenting a guide surface facing the feed plane provided with guide grooves aligned to receive the substantially parallel portions of the feed belts in sliding engagement therein.

10. The sheet feeder defined in claim 9 wherein the back plate is pivotally adjustable to change the distance by which the singulator extends beyond the feed plane and intrudes between the feed belts.

11. The sheet feeder defined in claim 1, further including buckling means mounted on the feed pedestal positioned to depress the upper edges of the forwardmost sheets advanced by the [supply] means *for supplying sheets* in a buckled, arched configuration, admitting air between the upper facing regions of adjacent sheets arriving at the feed plane.

12. The sheet feeder defined in claim 11 wherein the buckling means comprises a plurality of rollers positioned with their rims depressingly engaging the upper edges of the arriving adjacent sheets.

13. The sheet feeder defined in claim 1, further including a transfer assembly positioned between the discharged belt and the base, comprising a pair of transfer pinch rollers, a transfer ramp leading to a convergence line of tangent contact between the pinch rollers and defining therewith a transfer path extending from the feed end of the base through said line of tangent contact to the delivery end of the base, and also including clutch drive means connected to deliver driving force from the discharge belt to turn the transfer pinch rollers upon command.

14. A first sheet feeder defined in claim 13, aligned with at least one second sheet feeder positioned to deliver sheets along a delivery path to the transfer ramp near the feed end of the first sheet feeder, said delivery path of the second sheet feeder coinciding with the transfer path of the first sheet feeder, whereby a sheet from the second sheet feeder may be delivered via the transfer path for addition at a preselected position to the sheets successfully delivered along the delivery path of the first sheet feeder.

15. The sheet feeder defined in claim 1 wherein the [sheet supply] means *for supplying sheets* comprises endless ribbed elastomer timing belt means with a traction run arrayed down the length of the supply ramp, operatively connected to belt drive means positioned to move said traction run and the brick of sheets supported thereon toward the feed pedestal upon command.

16. The sheet feeder defined in claim 15 wherein the [sheet supply] means *for supplying sheets* comprises two substantially parallel endless ribbed elastomer timing belts spaced apart on the supply ramp.

17. The sheet feeder defined in claim 15, further including a supply sensor mounted on the feed pedestal disabled by the presence of a plurality of forwardmost sheets on the supply ramp and actuated by the absence of said sheets to initiate advancing movement of the traction run and the brick of sheets supported thereon toward the feed pedestal.

*18. A high speed sheet feeder comprising:*

*a supporting base;*

*a supply ramp and a feed pedestal each having a respective end, each end converging and being positioned above the base, each of the supply ramp and the feed pedestal sloping downwardly toward a point of convergence proximate the base, the supply ramp and feed pedestal defining, at the point of convergence, a feed slot for allowing sheets to pass between the feed pedestal and the supply ramp in a lengthwise direction extending downwardly toward the base;*

*a sheet supply conveyor for moving a stack of sheets on the supply ramp, each of the sheets in the stack having a face, the forwardmost of the sheets in the stack having a face in engagement with the feed pedestal and a lowermost edge of the forwardmost sheet being proximate the feed slot;*

*a pair of movable feed conveyors mounted on the feed pedestal, the feed conveyors being spaced-apart from each other in a widthwise direction transverse to the lengthwise direction, the feed conveyors having traction faces constructed and arranged to define a feeding plane adjacent the stack and the feed conveyors being constructed and arranged so that the traction faces engage a forwardmost face of a forwardmost sheet in the stack to drive the forwardmost sheet in a downward direction through the feed slot at a first velocity;*

*a singulator positioned at the end of the supply ramp proximate the point of convergence, the singulator extending into the feed slot at a location with respect to the widthwise direction aligned between each of the spaced-apart feed conveyors, the singulator extending through the feeding plane of the feed conveyors toward the feed pedestal so as to cause a lowermost edge of a sheet driven thereover by the feed conveyors to arch about a midsection of the sheet away from an adjacent sheet in the stack to break a fibre-lock frictional contact with the adjacent sheet; and*

*a sheet discharge conveyor positioned below the feed slot to receive sheets driven by the feed conveyors through the feed slot, the discharge conveyor being oriented to drive sheets to a discharge point remote from the feed slot and the discharge conveyor driving sheets at a second velocity that is faster than the first velocity.*

*19. The sheet feeder as set forth in claim 18 wherein the sheet discharge conveyor comprises a discharge belt and a pinch roller positioned against the discharge belt and the pinch roller deflecting a surface of the discharge belt to form a nip for receiving sheets.*

*20. The sheet feeder as set forth in claim 18 wherein the feed pedestal is sloped downwardly toward the base at a steeper angle than an angle of slope of the supply ramp toward the base.*

*21. The sheet feeder as set forth in claim 20 wherein the feed pedestal and the supply ramp define planar surfaces for contact with the stack and wherein the planar surfaces form an approximately right angle at the point of convergence.*

*22. The sheet feeder as set forth in claim 18 wherein the singulator is adjustable to change a distance of extension thereof toward the feed pedestal so that the size of the arch caused thereby in the sheets is variable.*

*23. The sheet feeder as set forth in claim 18 wherein the singulator comprises an elastomeric singulator belt having a traction face positioned along a direction of sheet travel through the feed slot.*

*24. The sheet feeder as set forth in claim 23 wherein the singulator belt includes an indexing drive to advance the singulator belt in periodic increments.*

*25. The sheet feeder as set forth in claim 18 wherein the discharge conveyor comprises a ribbed endless elastomeric timing belt.*

*26. The sheet feeder as set forth in claim 19 wherein the pinch roller is adjustably mounted to move the pinch roller between a maximum deflection of the discharge belt and a minimum deflection of the discharge belt wherein a respective maximum and minimum engagement of an arc of the pinch roller with the discharge belt is obtained.*

*27. The sheet feeder as set forth in claim 18 further comprising a controller for controlling movement of the sheet supply conveyor, the feed conveyors and the discharge conveyor.*

*28. The sheet feeder as set forth in claim 27 further comprising a plurality of sheet sensors, each responsive to the presence of a sheet at a predetermined point in the sheet feeder for signalling the controller.*

*29. The sheet feeder as set forth in claim 18 further comprising a brake plunger positioned to bias the forwardmost sheet in the stack away from the feed conveyors to interrupt feeder operation.*

*30. The sheet feeder as set forth in claim 18 wherein the feed conveyors comprise endless feed belts and the feed pedestal includes a back plate having lengthwise directed grooves thereon for guiding the feed belts.*

*31. The sheet feeder as set forth in claim 30 wherein the back plate is pivotally adjustable to change the positioning of the feed belts relative to the singulator.*

*32. The sheet feeder as set forth in claim 18 further comprising a buckling means mounted on the feed pedestal to depress upper edges of the forwardmost sheet and adjacent sheets thereto in the stack into a buckled arched configuration, thereby admitting air between upper ends of the forwardmost and the adjacent sheets thereto.*

*33. The sheet feeder as set forth in claim 32 wherein the buckling means comprises a plurality of rollers positioned to engage the upper edges of the forwardmost sheet and the adjacent sheets thereto.*

*34. The sheet feeder as set forth in claim 19 further comprising a transfer assembly positioned between the discharge belt and the base, comprising a pair of transfer pinch rollers, a transfer ramp having a face that extends into a tangent line between each of the pinch rollers and a clutch for delivering a driving force from the discharge belt to the transfer pinch rollers at predetermined times.*

*35. A sheet feeder as set forth in claim 34 including a means for interconnecting the sheet feeder to a second sheet feeder positioned to deliver sheets along a delivery path to the transfer ramp of the first sheet feeder, the delivery path of the second sheet feeder coinciding with a transfer path of the sheet feeder, whereby a sheet from the second sheet feeder is delivered to the transfer path of the sheet feeder for addition at a preselected time to the sheet feeder.*

*36. The sheet feeder as set forth in claim 18 wherein the sheet supply conveyor comprises endless ribbed elastomeric timing belts positioned along the length of the supply ramp, the belts including a drive to move the belts along the ramp toward the feed pedestal.*

*37. The sheet feeder as set forth in claim 36 further comprising a supply sensor positioned on the feed pedestal, the sensor signalling an absence of sheets to control driving of the conveyor to advance additional sheets of the stack toward the feed pedestal.*

* * * * *